United States Patent
Hoebeke et al.

(10) Patent No.: US 10,338,980 B2
(45) Date of Patent: *Jul. 2, 2019

(54) BINDING SMART OBJECTS

(71) Applicants: Koninklijke KPN N.V., The Hague (NL); IMEC VZW, Leuven (BE); Universiteit Gent, Ghent (BE)

(72) Inventors: Jeroen Hoebeke, De Pinte (BE); Girum Teklemariam, Jimma (ET); Floris Van Den Abeele, Sint-Martens-Latem (BE)

(73) Assignees: KONINKLIJKE KPN N.V., Rotterdam (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,639

(22) Filed: Sep. 15, 2017

(65) Prior Publication Data

US 2018/0004586 A1 Jan. 4, 2018

Related U.S. Application Data

(63) Continuation of application No. 15/107,428, filed as application No. PCT/EP2014/079133 on Dec. 23, 2014, now Pat. No. 9,792,165.

(51) Int. Cl.
*G06F 3/00* (2006.01)
*G06F 9/54* (2006.01)
*H04L 12/28* (2006.01)

(52) U.S. Cl.
CPC .......... *G06F 9/547* (2013.01); *H04L 12/2809* (2013.01)

(58) Field of Classification Search
CPC ........................................................ G06F 9/54
(Continued)

(56) References Cited

U.S. PATENT DOCUMENTS 7,792,256 B1 * 9/2010 Arledge .............. H04L 12/2818
348/143
9,792,165 B2 10/2017 Hoebeke et al.
(Continued)

OTHER PUBLICATIONS

Lei Gao, RESTful Web of Things API in Sharing Sensor Data (Year: 2011).*

(Continued)

*Primary Examiner* — Lechi Truong
(74) *Attorney, Agent, or Firm* — Hamilton, Brook, Smith & Reynolds, P.C.

(57) ABSTRACT

A method for binding a first and second devices is disclosed. The method is implemented using the architectural principles of REST, which allows a binding initiator to directly contact the first device and instruct the device of actions to be taken. Specifically, the binding initiator may contact the first device by providing a first REST request to the device, the request specifying that the first device is to monitor a state of a particular REST resource identified by the request and is to trigger the second device to perform a specified action when the state of that REST resource satisfies a particular condition. Using REST further allows the first device to directly contact the second device and instruct the second device to perform the specified action. Since the first device is now able to directly contact the second device, these two devices may be considered to be bound.

13 Claims, 15 Drawing Sheets

(58) Field of Classification Search
USPC .......................................................... 719/310
See application file for complete search history.

(56) References Cited

U.S. PATENT DOCUMENTS

| | | |
|---|---|---|
| 2005/0010932 A1 | 1/2005 | Kohno et al. |
| 2008/0313660 A1 | 12/2008 | Malik et al. |
| 2009/0083768 A1 | 3/2009 | Hatalkar et al. |
| 2009/0133013 A1 | 5/2009 | Criddle et al. |
| 2010/0077312 A1* | 3/2010 | Morss ................. H04L 12/2818 715/740 |
| 2010/0251329 A1* | 9/2010 | Wei ..................... H04L 63/1408 726/1 |
| 2012/0166642 A1* | 6/2012 | Saint Clair ........... H04L 67/125 709/225 |

OTHER PUBLICATIONS

International Search Report and Written Opinion, dated Feb. 6, 2015 for International Application No. PCT/EP2014/079133, entitled "Binding Smart Objects".

Gao, L. et al., "RESTful Web of Things API in Sharing Sensor Data," Mobile Life and New Media Laboratory, (2011).

* cited by examiner

BINDING SMART OBJECTS

RELATED APPLICATIONS

This application is a continuation of U.S. application Ser. No. 15/107,428, filed on Dec. 23, 2014, now U.S. Pat. No.: 9,792,165, which is the U.S. National Stage of International Application No. PCT/EP2014/079133, filed on Dec. 23, 2014, which designates the U.S., published in English, and claims priority under 35 U.S.C. §§ 119 or 365(c) to EP Application No. 13199388.3, filed on Dec. 23, 2013. The entire teachings of the above applications are incorporated herein by reference.

FIELD OF INVENTION

The disclosure generally relates to the field of constrained nodes or devices accessible over a network. In particular, though not necessarily, the disclosure relates to methods, devices, systems, and a computer program product for binding smart objects.

BACKGROUND

Sensor and actuator networks are deployed to affect the environment they are placed in based on events. A sensor monitors the physical environment. Information collected by the sensor is injected in the virtual world, processed and acted upon. Typically, acting upon monitoring information coming from sensors involves triggering an actuator, which will again impact the physical environment. For example, in a wireless home automation system pressing a button should trigger the light, where the button is an example of a sensor capturing the action of a user and where the light is an example of an actuator enabling power supply to the actual light source. Another straightforward example is the interaction between a temperature monitoring system and the heating/ventilation system.

In the past, most systems were closed proprietary systems that could only be interacted with through predefined user interfaces, leaving no room for customization or combinations with other systems. More recently, various devices, deployed as a network of nodes, have become useful for collecting and/or processing data in applications such as ambient intelligence, smart environments, and autonomous control. For example, networked sensors may be deployed in a building to measure the temperature and humidity such that an air conditioning system for the building may be adjusted autonomously. These networked devices generally comprise constrained nodes or constrained devices in a (constrained) network, where the term "constrained" is used to express presence of limitations in terms of, e.g., power and/or computing resources.

With the advent of technologies such as 6LoWPAN and Constrained Application Protocol (CoAP), these nodes have become easily accessible over the Internet, where each node is uniquely identifiable and where the nodes act as servers to which clients can connect. Such a system of server nodes is sometimes referred to colloquially as "Internet of Things" and the networks that connect these server nodes may be low power and lossy networks (LLNs). A client may be configured to access a server node through a server-client relationship, using the CoAP protocol. Typically, each of the server nodes has at least one resource that provides and/or processes specific information and can be identified by a uniform resource identifier (URI). Usually, the resource that provides specific information comprises a sensor resource while the resource that processes specific information and acts on it comprises an actuator resource. Examples of the kind of specific information provided and/or processed via the resource include temperature, humidity, room location, picture, or light control. When a client accesses a server node, it may e.g. query the server node for the resource at the node. For example, using the (conditional) observe option of the CoAP protocol in a GET request it is possible for a client to observe a resource on a sensor (e.g. sensor values such as e.g. the current temperature, the state of a light switch, the value of a parameter, etc.) and to receive notifications of interest. An actuator resource may process information received via a PUT/POST request on the resource (e.g. payload "1" means turning the light on, payload "0" means turning the light off, the desired temperature is provided to a smart thermostat, the value of a parameter is set, etc.).

While initiatives like 6LoWPAN and CoAP are making sensor networks more and more accessible to the outside world and give end users new opportunities to directly interact with these constrained devices, even with these open standards, the creation of interactions between sensors and actuators, referred to as "binding", is mostly under control of a third party. The third party, typically a gateway or a Cloud service, then both manages the collection of sensor events and the generation of corresponding triggers destined for actuators.

In view of the "real" IoT, where everything is connected to the Internet and everything can interact with everything, such involvement of a third party has a number of drawbacks. One drawback is that many users would like to have the possibility of initiating and controlling sensing and actuation from any device or any network. An example use case could be using a smart phone to change the settings of a home heating system. Another example could be a user at the gateway of an environmental monitoring system associating a sensor to send information to specific actuators to take action. Another drawback is that the third party needs to be available at all times and needs to offer all of the required functionality to establish bindings between the devices. Additionally, since all interactions take place via this third party, all traffic is routed via the third party. In some cases this can result in unnecessary traffic or increased latencies in the network.

Direct bindings, where the sensor directly triggers the actuator, could provide an alternative. However, at this moment, no generic solutions to realize such direct interactions exist. For example, one can (re)program the sensor and/or actuator in order to link them together. However this approach is cumbersome and not flexible. Other solutions to link two devices together can be realized via pairing (e.g. bringing a light switch in the proximity of the light it needs to control and starting a pairing procedure). This works at installation time, but it is much more difficult to update these bindings or create more advanced bindings.

What is needed in the art is a mechanism for binding smart objects that overcomes one or more drawbacks described above. In particular, there is a need in the art for improved methods and systems that enable such binding by a software program.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java.™., Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method, performable by a first device, for binding the first device with a second device for executing an action on the second device is provided. The method is implemented according to the architectural principles of Representational State Transfer (REST). The method includes receiving, at a first device, from a binding initiator, a first REST request for a first REST resource on the first device, where the first REST request comprises at least an identification of an action to be executed on a second device and an identification of a condition for executing the action on the second device. The method further includes the first device storing, in a binding table in the local memory of the first device, the identification of the action to be executed on the second device and the identification of the condition for executing the action on the second device. These identifications from the first REST request are stored in the binding table as information related to the first REST resource, i.e. in a way that makes clear that these identifications were provided in a request for the first REST resource. The method also includes monitoring, by the first device, a state of the first REST resource identified by the first REST request to determine whether the state satisfies the condition identified in the first REST request, and, after determining that the state of the first REST resource satisfies the condition, providing, from the first device to the second device, a trigger for the second device to execute the action identified in the first REST request, where the trigger is provided in a form of a second REST request. The second request may either be associated to a single REST resource on the second device or a group of REST resources on multiple second devices.

Embodiments of the present invention are based on recognition that the architectural principles of REST may provide the necessary means for the binding initiator to bind the first and second devices. Using REST allows the binding initiator to directly contact the first device and instruct the first device of actions to be taken. Specifically, the binding initiator may contact the first device by providing a first REST request to the first device, the request specifying that the first device is to monitor a state of a particular REST resource identified by the request and is to trigger the second device to perform a specified action when the state of that REST resource satisfies a particular condition. Using REST further allows the first device to directly contact the second device and instruct the second device to perform the specified action. Since the first device is now able to directly contact the second device, these two devices may be considered to be bound or linked. By using REST, the binding initiator may advantageously perform initial binding as well as change the existing binding of any first and second devices in an easy and flexible manner. Moreover, in order for the second device to be triggered to perform the specified action, involvement of a third party (e.g. the binding initiator) is no longer necessary as the first device can decide itself whether the triggering is necessary and trigger the second device directly.

As used herein, the term "REST resource" refers to a network data object or service that provides or processes specific information and can be identified by an URI. Examples of such resources include "http://example.org/temperature", "/humidity", "/room_location", "/picture", and "/light_control". As used herein, the term "state" of a REST resource refers to the state of the underlying network data object or service to which the REST resource refers. When the state of a resource is requested, a representation of the resource state is transferred. A representation is a sequence of bytes that encodes information about the resource state, plus representation metadata to describe those bytes. For example, the first device may comprise an analog sensor capable of measuring the temperature. The output of the analog temperature sensor is a voltage. Software running on the first device can retrieve this voltage and convert it to a temperature value according to a given formula. To make the temperature value available to the outside world over the Internet, REST communication is used. This is achieved by modeling the temperature value as a REST resource identified by a URI such as coap://[IPv6 address of the sensor]/m/t. The resource state can then be seen as the temperature value. For example, at time t1, the resource state may be "25" while at time t2 the resource state may be "26". The REST resource is the same (i.e., the temperature), but its state has changed. When receiving a request for the resource coap://[IPv6 address of the sensor]/m/t, the first device will return a representation of the resource state. For example, for a resource state of "25" the first device may encode the resource state as "25 C" or "{"e":[{"n": "/m/t", "v": 27.2, "u": "deg C."},}". The corresponding representation metadata will indicate that the representation is in plain text and senml+json, respectively.

Each of the first and second devices are associated with a node identifier, e.g., to uniquely address the node, and are configured with at least one REST resource. Generally, the first device comprises a sensor. For example, a first device having various measuring sensors such as e.g. a temperature sensor and/or a humidity sensor may be considered a node with REST resources including "/temperature" and/or "/humidity". A battery-powered first device may be considered a node with a REST resource "/battery_level" or any suitable resource for revealing the device's battery level. A first device located at a particular room in a building may be considered a node with a REST resource "/room_number" or any suitable resource which reveals information associated with the device. While the first device generally comprises a sensor, the second device generally comprises an actuator in a form of a REST resource associated with an action that can be executed on the second device. The action could be e.g. turning on a light or adjusting a setting of an air conditioner. Thus, e.g. a second device capable of switching on or off the light may be considered as a node with a REST resource "/light_control". The second device may be configured with certain capabilities, which may enable the device to respond to certain types of requests and/or perform certain actions. Typically, one or both of the first and second devices may include a constrained device.

As used herein, the term "binding initiator" is used to describe a third device that initiates linking of the first and second devices. Such a device may be any device that is communicably connected to at least the first device, e.g. a personal computer, a portable computer, a smart phone, a tablet, a Cloud server, or a gateway device.

In an embodiment, the method further comprises providing a response to the binding initiator indicating receipt of the first REST request. This embodiment advantageously allows the binding initiator to be assured that the request has been received and/or accepted by the first device and that the first device will attempt to bind itself to the second device.

In an embodiment, the method further comprises providing, from the first device to the binding initiator, information indicative of the state of the first REST resource when the state changes and satisfies the condition identified in the first REST request. In various embodiments, this may be done in all cases or only in cases when the first REST request comprises an indication that when the state of the first REST resource changes and satisfies the condition identified in the first REST request, the state of the first REST resource is to be provided to the binding initiator. This embodiment may combine the default behavior, where the binding initiator receives all notifications of interest, with the binding feature. This embodiment may be particularly advantageous for debugging purposes, since the action on the second device can be linked to the notification received by the binding initiator.

In yet another embodiment, the method may further comprise the first device making at least part of information stored in the binding table available via a second REST resource hosted by the first device, the second REST resource being different from the first REST resource. In this manner, the binding initiator or any other device that is allowed to access the second REST resource can verify the existence of all bindings that have been established on the first device. In an alternative embodiment, the method may further comprise the first device making at least part of information stored in the binding table available through a GET request for the first REST resource with a URI query.

In an embodiment, the method may further comprise receiving, at the first device, from either the binding initiator or a further device, a third REST request comprising an indication that the first device should no longer provide the trigger to the second device to execute the action identified in the first REST request, and removing the identification of the action to be executed on the second device and the identification of the condition for executing the action on the second device from the binding table. This embodiment advantageously allows cancellation of bindings between the first and second devices. In addition, receipt of the third REST request from a further device offers the possibility that third parties with sufficient access rights can control (e.g., verify and remove) the bindings.

In an embodiment, the method may further comprise the first device providing to a binding directory external to the first device at least part of the information related to the first REST resource as stored in the binding table. By storing all information related to bindings of the various first devices in a binding directory, it is possible to obtain an up-to-date overview of all available bindings in the network that the binding directory is responsible for. The binding directory is preferably structured so that it can easily be queried, filtered, and verified.

In an embodiment, the method may further comprise providing, from the first device to the second device, at least a part of the first REST request as an indication of a creation of binding between the first device and the second device, and receiving, at the first device, from the second device, an indication that the creation of binding has been accepted by the second device. Such an embodiment allows the second device to implement specific policies determining which bindings will be allowed. This way the second device can determine from whom it will accept REST requests for triggering an action in the real world.

In an embodiment, the method may further comprise the first device obtaining a binding identification (B-ID) identifying the binding between the first device and the second device and the first device including the binding identification within the second REST request provided to the second device. The second device may be configured to only accept the second REST request when the request includes a known binding ID. The use of the binding ID ensures that the execution of the action on the second device, triggered by second request, is done in a secure manner. In various embodiments, the binding ID may be generated by the binding initiator, the first device, or the second device.

According to another aspect of an embodiment of the present invention, a first device configured for binding the first device to the second device is provided. The first device includes at least a receiver and a processor. The receiver is configured for receiving, from a binding initiator, a first REST request for a first REST resource hosted by the first device, the first REST request comprising at least an identification of an action to be executed on a second device and an identification of a condition for executing the action on the second device. The processor is configured for ensuring that the identification of the action to be executed on the second device and the identification of the condition for executing the action on the second device are stored in a binding table within the memory elements of the first device as information related to the first REST resource. The processor is further configured for ensuring that a state of the first REST resource is monitored to determine whether the state satisfies the condition identified in the first REST request, and, after determining that the state of the first REST resource satisfies the condition, ensuring that a trigger is provided from the first device to the second device, e.g. via the data transmitter of the first device. The trigger is provided in a form of a second REST request and comprises an instruction for the second device to execute the action identified in the first REST request.

According to another aspect of an embodiment of the present invention, a binding initiator configured for use in the methods described herein and/or with the first device described herein is provided. The binding initiator is configured at least for providing to the first device the first REST request for the first REST resource hosted by the first device, the first REST request comprising at least the identification of the action to be executed on the second device and the identification of the condition for executing the action on the second device.

According to yet another aspect of an embodiment of the present invention, a second device configured for use in the methods described herein and/or with the first device described herein is provided. The second device comprises at least a receiver configured for receiving the second REST request comprising the trigger to execute the action identified in the first REST request, and a processor ensuring that, in response to receiving the second REST request, the action is executed.

A system comprising two or more of the binding initiator, the first device, and the second device as described herein.

The disclosure may also relate to a computer program product, implemented on computer-readable storage medium, preferably non-transitory, where the computer program product may comprise software code portions configured for, when run a computer, executing the method steps according to any of the methods described in the present disclosure. The computer program product is preferably implemented at least in part in the first device. Corresponding computer program products that enable the functionality of the binding initiator and the second device may be implemented in those respective devices.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
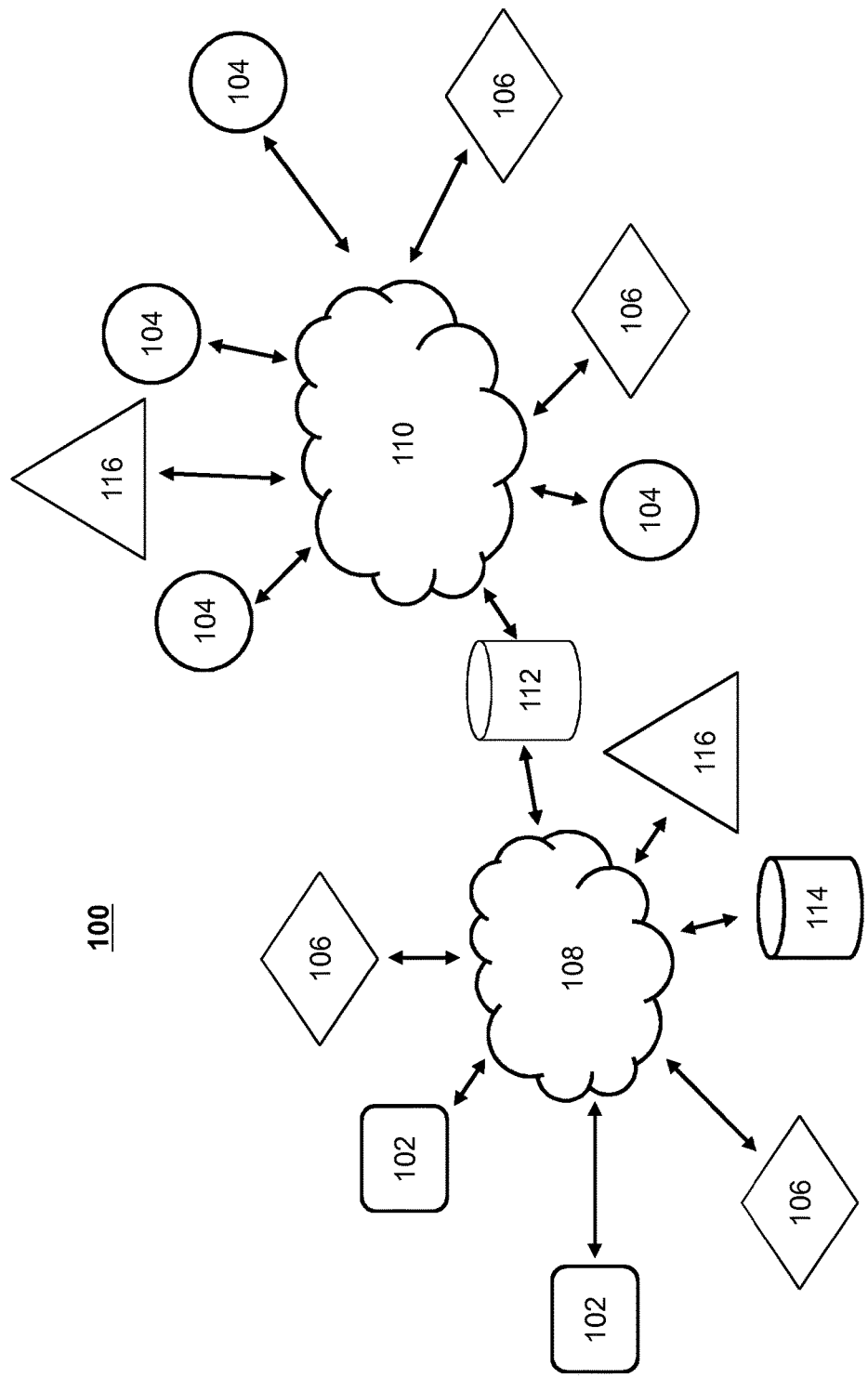
FIG. 1 shows an exemplary system comprising a binding initiator, a first device, and a second device, according to one embodiment of the present disclosure.

FIG. 1 shows an exemplary system 100 in a typical scenario comprising a plurality of binding initiators 102, a plurality of first devices 104, and a plurality of second devices 106, according to one embodiment of the present disclosure. Each of the binding initiators, the first devices, and the second devices could be connected either to a first communication network 108, such as e.g. Internet, or a second communication network 110, such as e.g. a local network which is lossy and/or unreliable, e.g. LLN.

Each of the first devices 104 and second devices 106 are associated with a node identifier that uniquely addresses the node, and are configured with at least one REST resource. One or both of the first and second devices may include a constrained device.

Each of the first devices 104 may be communicably connected to at least one second device 106 over a wired or wireless (or a combination of both) communication network and may include applications configured to transmit REST requests to the second devices 106. The first device 104 is a device that exposes resources, identified using URIs, with which other devices can interact, i.e. the first device 104 acts in this case as a RESTful CoAP server. Generally, the first device 104 comprises a sensor, e.g. a temperature sensor with a REST resource "/temperature" and/or a humidity sensor with a REST resource "/humidity". Such a sensor monitors a real-world phenomenon, in these examples—temperature and/or humidity, and exposes the status of this real-world phenomenon as a REST resource. Subsequently, through this resource the state of the phenomenon, or a subset of all possible states, can be observed. The first device 104 is also capable of acting as a RESTful CoAP client, i.e. is capable of making CoAP requests itself, e.g. requests to the second device 106, as described in greater detail below.

The second device 106 or group of devices refers to a device that exposes a REST resource identified by an URI. In case of a group of devices, a single URI should identify multiple resources on the devices in the group. Generally, the second device 106 comprises an actuator capable of executing an action that impacts the real world. The actuator is implemented in a form of a REST resource associated with an action that can be executed on the second device 106. The action could be e.g. adjusting the temperature of a heating system or turning a light on and off. For example, the second device 106 capable of adjusting the temperature may be considered as a node with a REST resource "/temperature_control", while the second device 106 capable of switching on or off the light may be considered as a node with a REST resource "/light_control". The second device 106 may be configured with certain capabilities, which may enable the device to respond to certain types of requests and/or perform certain actions.

Each of the binding initiators 102 comprises a device that initiates binding between the first device and at least one second device or a group of second devices. Such a device may be any device that is communicably connected to at least one first device 104 over a wired or wireless (or a combination of both) communication network. Examples of a binding initiator 102 device include a personal computer, a portable computer, a smart phone, a tablet, a Cloud server, or a gateway device. Typically, the binding initiator 102 is a client or a user device and may include (user) applications configured to transmit REST requests to one or more first devices 104 acting as servers. The binding initiator 102 is configured to access the first device 104 through a server-client relationship, using a protocol such as CoAP to access and/or manipulate resources located at the first device.

Although FIG. 1 illustrates plurality of binding initiators, first devices, and second devices, it is possible that the system 100 includes only one of some or all of these devices.

The system of FIG. 1 further shows a gateway node 112 located between the first and second communication networks and an optional binding directory 114, described in greater detail below. The system may also, optionally, comprise additional devices, shown as further devices 116, which refer to devices other than the other devices depicted in FIG. 1.

Figure 2:
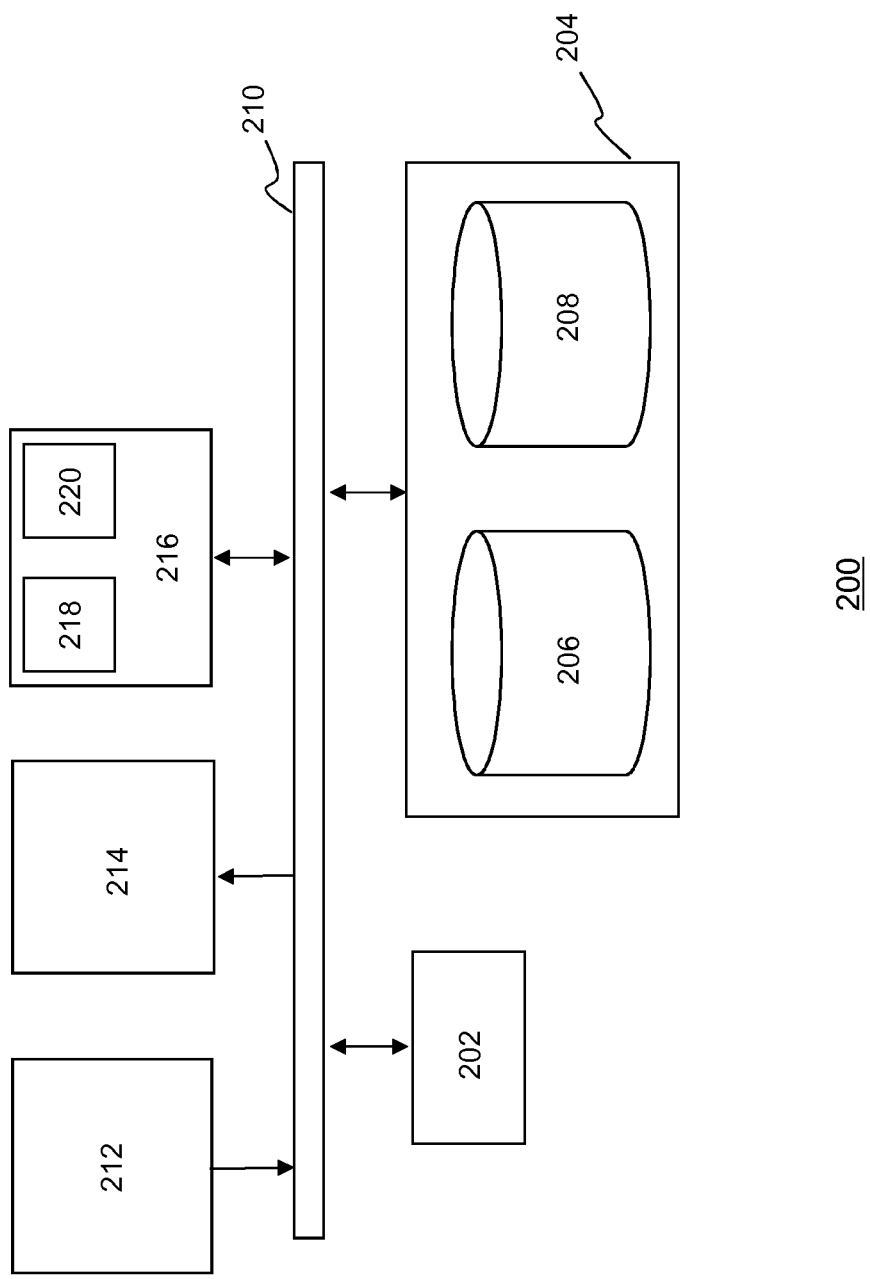
FIG. 2 shows a block diagram illustrating an exemplary data processing system that may be used as a first device shown in FIG. 1, according to one embodiment of the present disclosure.

FIG. 2 shows a block diagram illustrating an exemplary data processing system 200 that may be used as a first device shown in FIG. 1, according to one embodiment of the present disclosure.

Data processing system 200 may include at least one processor 202 coupled to memory elements 204 through a system bus 210. As such, the data processing system may store program code within memory elements 204. Further, processor 202 may execute the program code accessed from memory elements 204 via system bus 210. In one aspect, data processing system 200 may be implemented as a computer that is suitable for storing and/or executing program code. It should be appreciated, however, that system 200 may be implemented in the form of any system including a processor and memory that is capable of performing the functions described within this specification.

Memory elements 204 may include one or more physical memory devices such as, for example, local memory 206 and one or more bulk storage devices 208. Local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from bulk storage device 208 during execution.

Input/output (I/O) devices depicted as input device 212 and output device 214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 216 may also be coupled to data processing system to enable it to become coupled to other systems, computer systems, remote network devices, and/or remote storage devices through intervening private or public networks. The network adapter may, in particular, comprise a data receiver 218 for receiving data that is transmitted by said systems, devices and/or networks to said data and a data transmitter 220 for transmitting data to said systems, devices and/or networks. Modems, cable modems, and Ethernet cards are examples of different types of network adapter that may be used with data processing system 200.

The memory elements 204 may store an application (not shown). It should be appreciated that data processing system 200 may further execute an operating system (not shown) that can facilitate execution of the application. Application, being implemented in the form of executable program code, can be executed by data processing system 200, e.g., by processor 202. Responsive to executing application, data processing system may be configured to perform one or more operations to be described herein in further detail.

In one aspect, for example, data processing system 200 may represent a client data processing system. In that case, the application stored therein may represent a client application that, when executed, configures data processing system 200 to perform the various functions described herein with reference to a "client". Examples of a client can include, but are not limited to, a personal computer, a portable computer, a mobile phone, or the like.

In another aspect, data processing system 200 may represent a server. For example, data processing system 200 may represent an HTTP server in which case the application stored therein, when executed, may configure data processing system 200 to perform HTTP server operations.

Each of the binding initiators 102 and the second devices 106 may also be implemented in a form of a data processing system similar to the one shown in FIG. 2 (not shown in FIGs). In particular, the binding initiator 102 configured for use in the methods described herein and/or with the first device 104 described herein includes at least a data transmitter for providing to the first device the first REST request as described herein. In addition, the binding initiator may also optionally include a processor for generating the first REST request and memory for storing at least a part of the first REST request and/or data necessary for its generation, such as e.g. unique identifiers of the different first devices, and/or also possibly for storing a computer program comprising software code portions configured, when executed by the processor of the binding initiator, for providing the functionality of the binding initiator to the device. Similarly, the second device 106 configured for use in the methods described herein and/or with the first device 104 described herein and/or with the binding initiator 102 includes at least a data receiver for receiving from the first device the second REST request as described herein. In addition, the second device 106 may also optionally include a processor for processing the second REST request and ensuring execution of the action triggered by the second REST request. The second device may further optionally include a memory for storing at least a part of the second REST request or data necessary for its processing, and/or also possibly for storing a computer program comprising software code portions configured, when executed by the processor of the second device, for providing the functionality described herein to the second device.

According to yet another aspect of an embodiment of the present invention, a second device configured for use in the methods described herein and/or with the first device described herein is provided. The second device comprises at least a receiver configured for receiving the second REST request comprising the trigger to execute the action identified in the first REST request, and a processor ensuring that, in response to receiving the second REST request, the action is executed.

Figure 3:
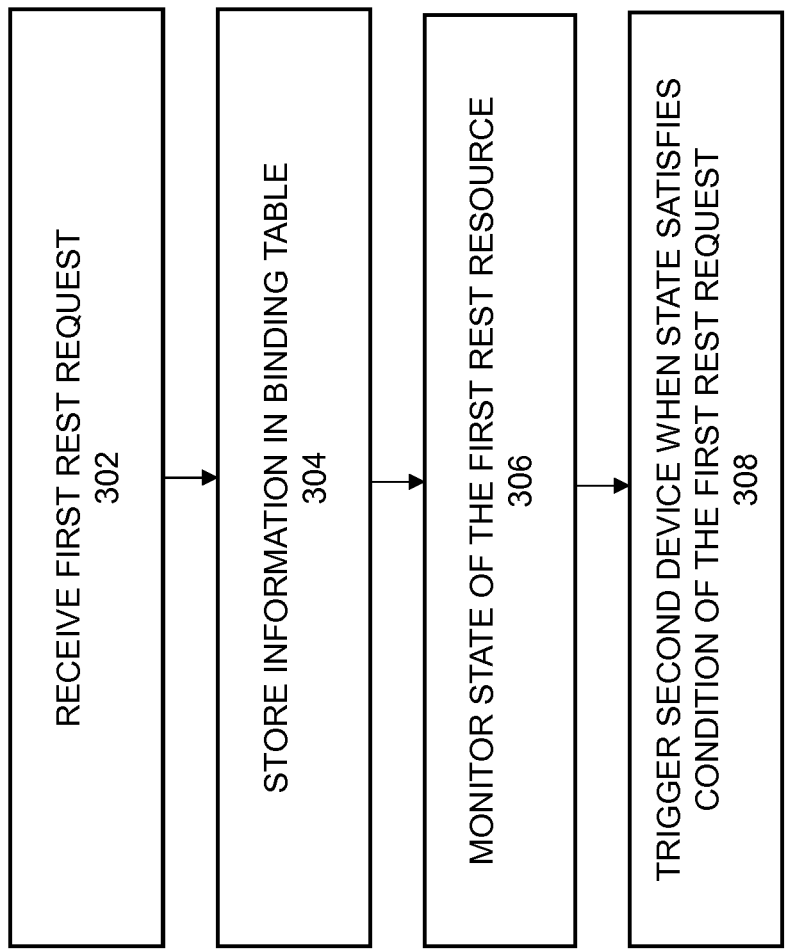
FIG. 3 provides a flow diagram of method steps for binding the first and second devices, according to one embodiment of the present disclosure.

FIG. 3 provides a flow diagram of method steps for binding the first and second devices, according to one embodiment of the present disclosure. While the method steps are described in conjunction with the elements shown in FIG. 1 and FIG. 2, persons skilled in the art will recognize that any system configured to perform the method steps, in any order, is within the scope of the present invention. The method of FIG. 3 may be implemented using any protocol, e.g. HTTP or CoAP, that follows the architectural principles of REST.

The method may begin in step 302, where the first device 104 receives, from the binding initiator 102, a first REST request for a first REST resource on the first device. The first REST request identifies the first REST resource since it uses the URI of the first REST resource. As used herein, the term "first REST resource" refers only to the resource that is identified by the REST request and not another REST resource which could also be hosted on the first device 104. An example of a REST resource identified by the REST request is the resource R1 in the request GET coap://[aaaa::1]/R1 OPTION_OBSERVE, OPTION_BIND_INFO, where R1 is identified by URI of the request. On the other hand, an example of a REST resource that is referred to in the REST request but is not identified by the URI of the request is the resource R2 in the request POST coap://[aaaa::1]/BINDING PAYLOAD(/R2, OBSERVE, BIND_INFO), where R2 is not identified by the URI, but provided as a payload.

The first REST request received in step 302 comprises, as options between the header and the payload or as a payload, at least an identification of an action to be executed on the second device 106 and an identification of a condition for executing the action on the second device. For example, if the first REST resource on the first device 104 is a temperature sensor and the second device 106 is an actuator for controlling the temperature of a heating system, the first REST request could include the identification of an action to be executed on the second device 106 as "turn on the heater" and the identification of the condition for executing the action as "when temperature is less than 15 C". If the first device 104 has the IPv6 address [aaaa::1] and exposes the temperature via a REST resource /s/t and the second device 106 has the IPv6 address [aaaa::2] and exposes the actuator functionality via a REST resource /a/h, the resulting first request may be realized as GET coap://[aaaa::1]/s/t OPTION_CONDITIONAL_OBSERVE(LESS_THAN,15), OPTION_BIND_INFO(PUT,[aaaa::2],/a/h),on). The conditional observe option in the CoAP request identifies the condition for executing the action, whereas the bind info option (or multiple options) identifies the action to be executed.

In step 304, the first device 104 stores information from the first REST request, namely the identification of the action to be executed on the second device and the identification of the condition for executing the action on the second device, in a binding table. The binding table is stored in the memory 204, within the first device 104. The information from the first REST request is stored in the binding table in a way that makes clear that the information is related to first REST resource and/or to the first REST request and in a way that allows the information to later be queried or searched.

Since the binding table is implemented as a part of the memory local to the first device, typically the binding table will contain only binding information related to the first device itself. On the other hand, as an option, the first device 104 may also be configured to store at least part of the information associated with the first REST request in a binding directory implemented as memory external to the first device 104 (not shown in FIGs). The binding directory could be a directory where multiple first devices 104 can register their bindings by storing the information from the first REST requests they received. To that end, a binding directory could be viewed as a collection of multiple binding tables on a more powerful device. Thus, as used herein, while the term "binding table" describes binding information stored locally on a first device, the term "binding directory" describes a global repository where binding information from multiple first devices (i.e., an overview of bindings installed across multiple devices) is stored. Whenever binding information changes in the first device, the first device can be configured to inform the remote binding directory about the change.

In step 306, the first device 104 monitors the state of its first REST resource identified by the first request to determine whether the state satisfies the condition provided in the first request. After determining that the state of the first REST resource satisfies the condition, in step 308, the first device 104 generates a trigger for the second device 106, in the form of a second REST request for the actuator resource on the second device, addressed by its unique URI, and triggers the second device 106 to execute the action identified in the first request by providing the trigger to the second device. Such a second REST request could be e.g. PUT coap://[aaaa::2]/a/h PAYLOAD(on), for the case when the first device triggers the second device to turn on the heater.

In an embodiment, the second REST request could be a REST request to a group of resources on multiple second devices 106. Such a second REST request could be e.g. PUT coap://[ffle::89:abcd]/a/l PAYLOAD(on), for the case when the first device triggers a group of multiple second devices identified by the IPv6 multicast address [ffle::89:abcd] to turn on the light they control.

The steps 302-308 may be performed not only to create the initial binding between the first and second devices but also to update the existing binding of any first and second devices in an easy and flexible manner. By using REST requests to trigger the second device to perform the specified actions, involvement of a third party, even the binding initiator 102, is no longer necessary because the first device 104 is now configured to decide itself whether the triggering is necessary and trigger the second device directly.

Figure 4:
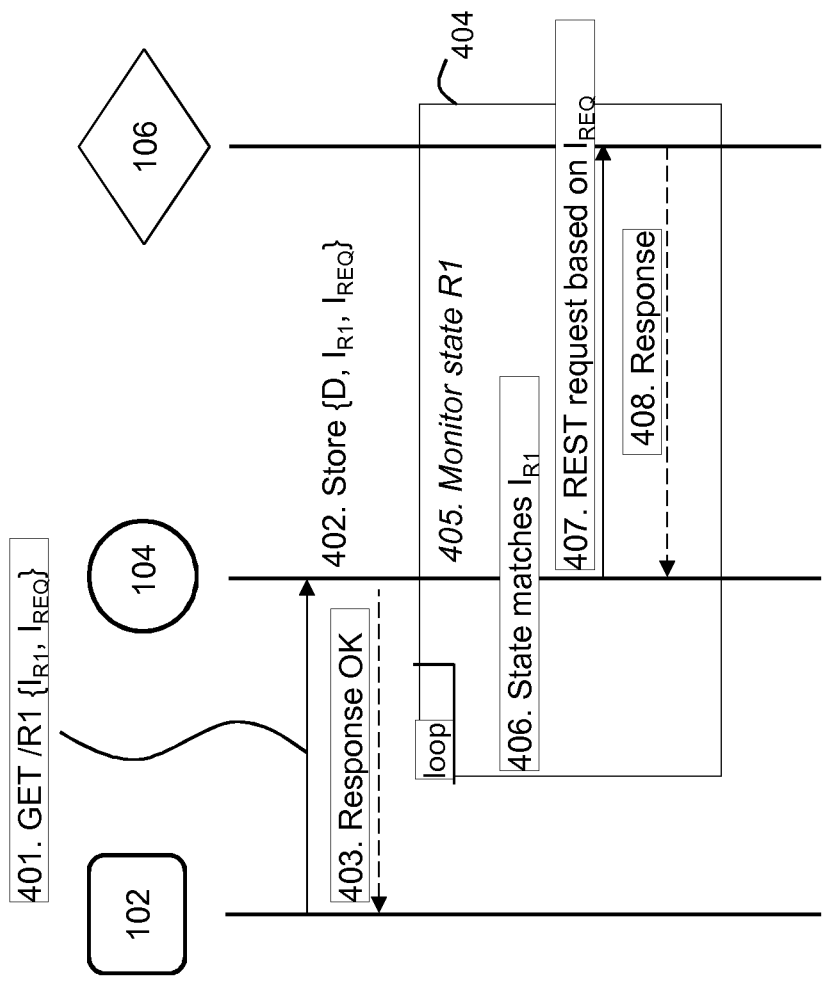
FIG. 4 shows an exemplary messaging diagram illustrating binding between the first and second devices, according to one embodiment of the present disclosure.

FIG. 4 shows an exemplary messaging diagram illustrating binding between the first and second devices, according to one embodiment of the present disclosure. The binding illustrated in FIG. 4 is done according to the basic method described in FIG. 3. As shown in FIG. 4 with step 401, the first device 104 receives from the binding initiator 102 a first REST request for a REST resource (R1) hosted by the first device. In the example of FIG. 4, the first REST request is a GET request, while, in other embodiments, any other RESTful request could be used, e.g. PUT, POST, or DELETE. The first REST request comprises information to derive all resource states of interest ($I.sub.R1$), e.g. CoAP observe option, CoAP conditional observe, URI query indicating states of interest, etc., and information for executing a second REST request ($I.sub.REQ$), said second request associated to a resource on a second device or group of resources on multiple second devices. In particular, $I.sub.REQ$ comprises the identification of the action to be executed on the second device 106 and $I.sub.R1$ the identification of the condition for executing the action on the second device. In step 402, the first device 104 stores the binding information for deriving all resource states of interest indicated by the binding initiator and the information for executing said second REST request in the binding table. As shown in FIG. 4, in that step the first device 104 may also store an identifier of the binding initiator (D), e.g. the IPv6 address and port used by the binding initiator for sending the first REST request.

In an optional step 403, the first device 104 provides a response to the binding initiator 102, thus indicating to the binding initiator that the first device 104 received and accepted the first REST request.

Box 404 in FIG. 4 is intended to illustrate a loop of steps 405-408. In step 405, the first device monitors the state of the resource R1, the state possibly changing between different values. In step 406, the first device 104 determines that the state of R1 matches $I.sub.R1$. In step 407, the first device 104 provides the second REST requested based on $I.sub.REQ$ to the second device 106. In an optional step 408, the first device receives a response from the second device indicating that the second device has received and/or processed the second REST request.

Figure 5:
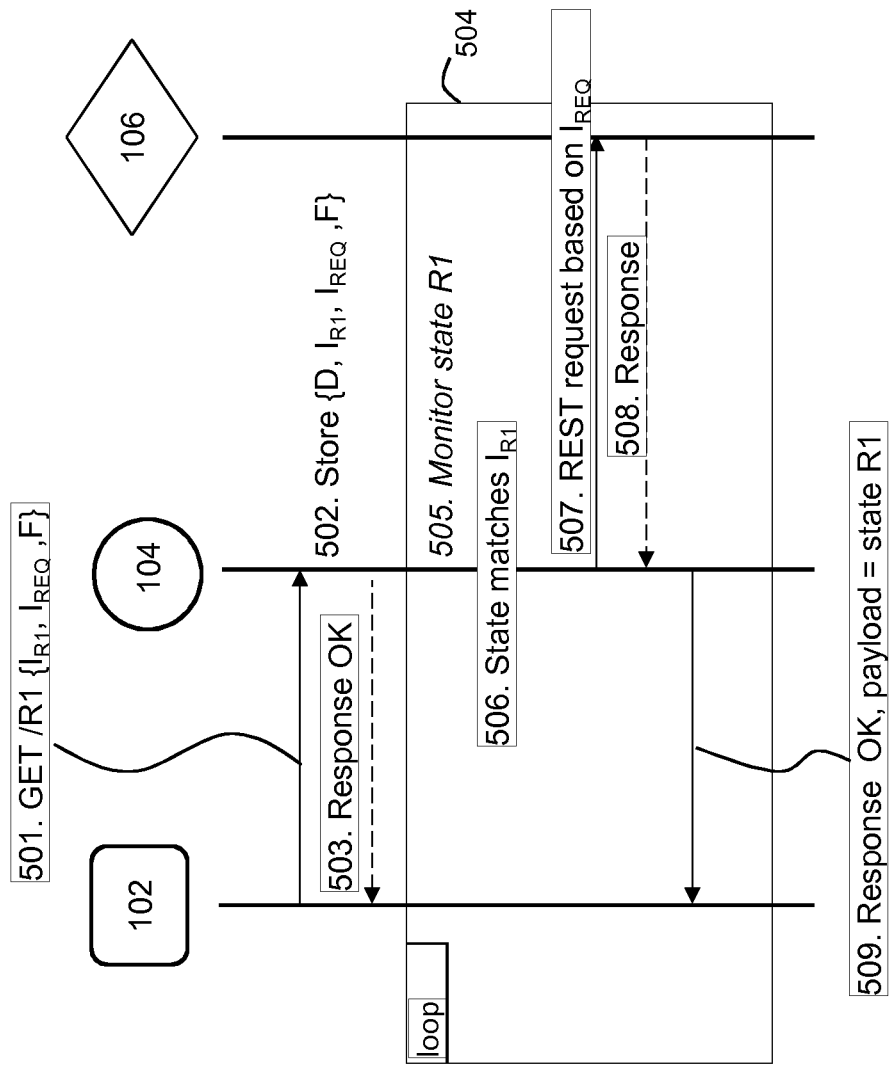
FIG. 5 shows an exemplary messaging diagram illustrating binding between the first and second devices and informing the binding initiator, according to one embodiment of the present disclosure.

FIG. 5 shows an exemplary messaging diagram illustrating binding between the first and second devices and informing the binding initiator, according to one embodiment of the present disclosure. In step 501, the binding initiator 102 provides a first REST request to the first device 104, which is similar to the request of step 401, described above, but also further comprises an indication that the binding initiator is to be informed about state changes of interest. Such an indication may be provided e.g. in a form of a flag F. In step 502, the first device 104 stores information in its binding table, similar to step 402, except that it further stores the indication that the binding initiator 102 is to be informed about state changes of interest. Optional step 503 is analogous to the step 403.

Box 504 in FIG. 5 is intended to illustrate a loop of steps 505-509, where steps 505, 506, 507, and 508 are analogous to steps 405, 406, 407, and 408, respectively, and therefore, their description is not repeated. In step 509, the first device 104 informs the binding initiator that the state changed and that the state satisfies the condition identified in the first REST request by e.g. providing the value of the state of resource R1 as a payload. While steps 507 and 509 are shown as consecutive steps in FIG. 5, in other embodiments, these steps may be executed in parallel.

This embodiment combines what could be considered a default behavior where the binding initiator receives all notifications of interest, with the binding feature. As such, the embodiment may be particularly advantageous for debugging purposes, since the action on the second device 106 may be directly linked to the notifications received by the binding initiator 102.

Figure 6:
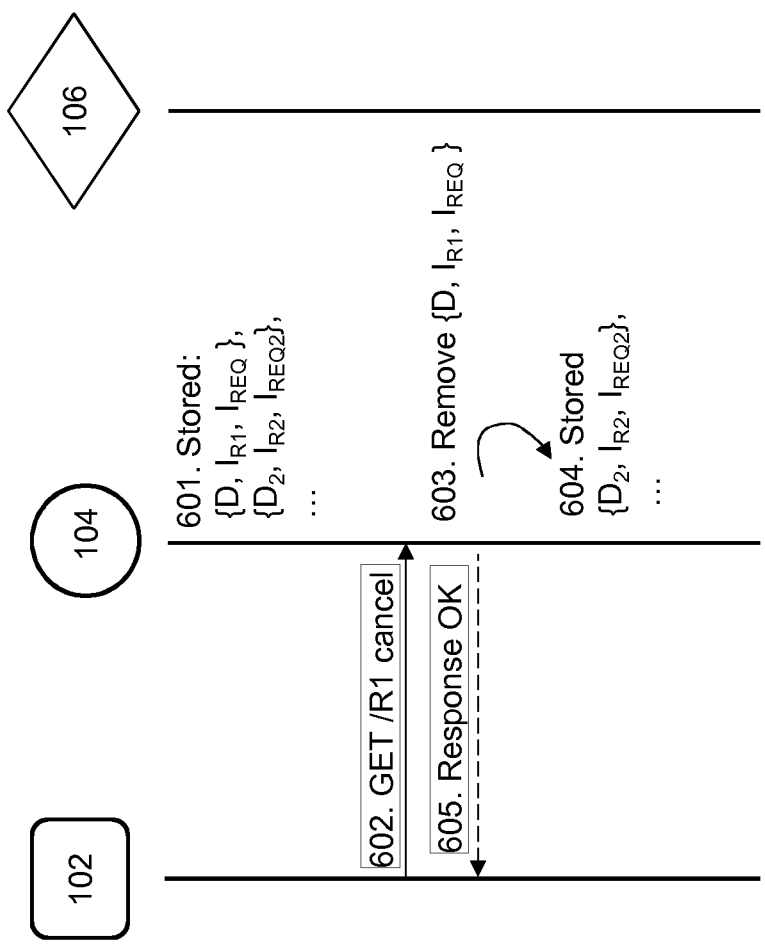
FIG. 6 shows an exemplary messaging diagram illustrating means for cancellation of binding between the first and second devices, according to one embodiment of the present disclosure.

FIG. 6 shows an exemplary messaging diagram illustrating means for cancellation of binding between the first and second devices, according to one embodiment of the present disclosure. The implementation shown in FIG. 6 may include the steps described in FIG. 4 and/or FIG. 5, establishing one or more bindings between the first device and one or more second devices. As a result, the binding table on the first device 104 may contain multiple entries, as shown in FIG. 6 with step 601. In step 602, the first device 104 receives a third REST request from the binding initiator 102 indicating that the binding initiator is no longer interested in the resource states of interest. In response to receiving this request, in step 603, the first device 104 removes all stored information related to the resource state of interest and the second REST request from the binding table, which results in the binding table containing the entries shown in step 604. In the optional step 605, the first device 104 may be configured to provide to the binding initiator a response indicating that the first device has removed binding information associated with the request for the resource R1.

Figure 7:
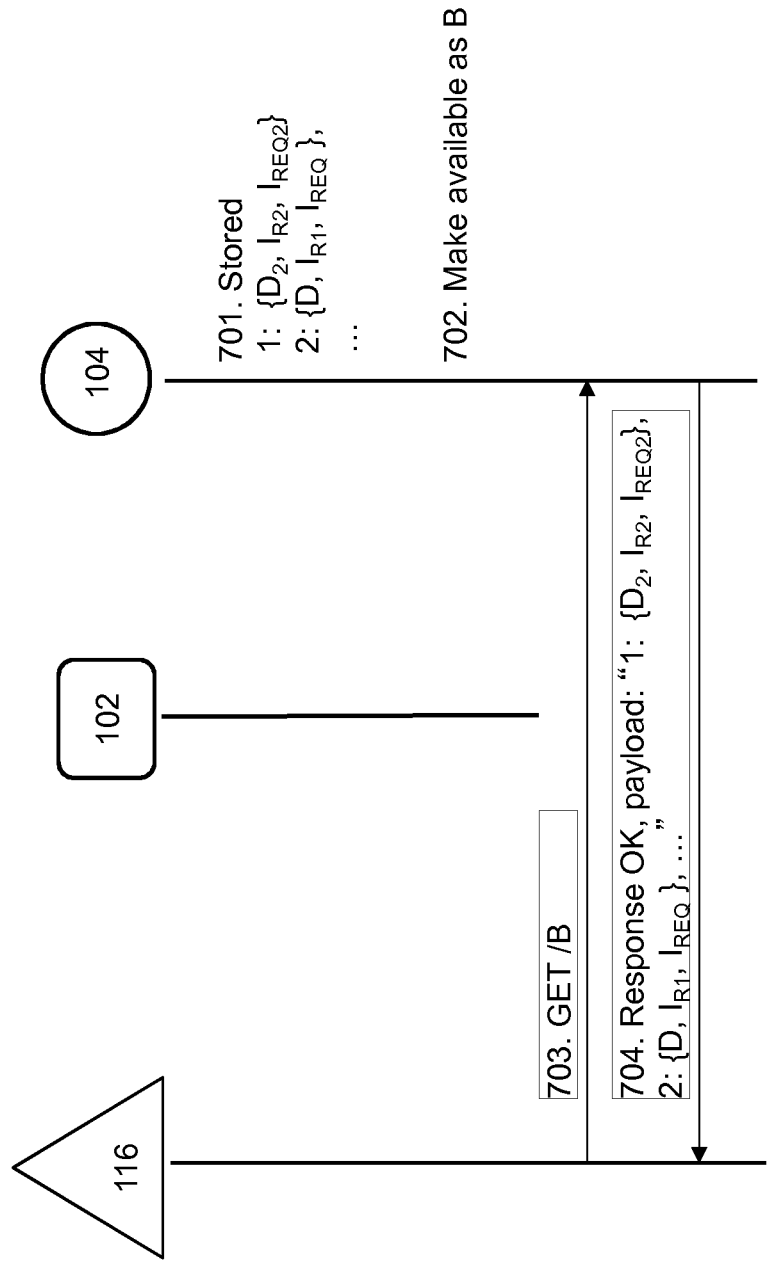
FIG. 7 shows an exemplary messaging diagram illustrating means for exposing binding information, according to one embodiment of the present disclosure.

FIG. 7 shows an exemplary messaging diagram illustrating means for exposing binding information, according to one embodiment of the present disclosure. The implementation shown in FIG. 7 may include the steps described in FIG. 4 and/or FIG. 5, establishing one or more bindings between the first device and one or more second devices. As a result, the binding table on the first device 104 may contain multiple entries, as shown in FIG. 7 with step 701 with binding entries related to REST resources R1 and R2 hosted by the first device 104. In step 702, the first device 104 makes the stored binding information available via a separate, well-defined REST 'binding' resource B. In step 703, the further, third, device 116 may access the resource B, via a REST request for resource B to the first device 104. The further device 116 may do so e.g. in order to verify the existence of all bindings that have been established on the first device 104. In step 704, in response to the REST request from the further device 116, the first device 104 provides a response to the further device 116, containing as a payload all of the bindings stored in the binding table of the first device.

Figure 8:
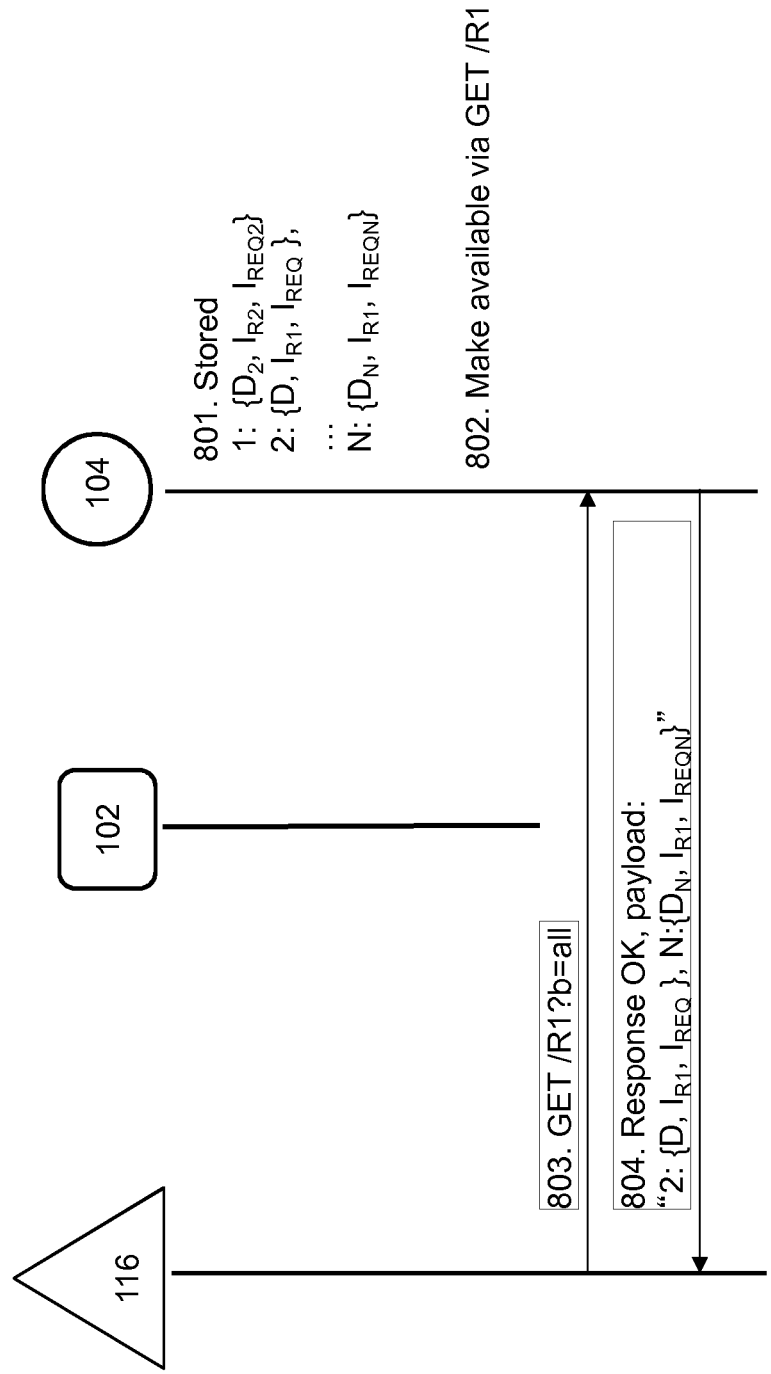
FIG. 8 shows an exemplary messaging diagram illustrating means for exposing binding information, according to another embodiment of the present disclosure.

FIG. 8 shows an exemplary messaging diagram illustrating means for exposing binding information, according to another embodiment of the present disclosure. The implementation shown in FIG. 8 may include the steps described in FIG. 4 and/or FIG. 5, establishing one or more bindings between the first device and one or more second devices. As a result, the binding table on the first device 104 may contain multiple entries, as shown in FIG. 8 with step 801 with binding entries related to REST resources R1 and R2 hosted by the first device 104. In step 802, the first device 104 makes the stored binding information for the first REST resource R1 available through a GET request for that resource with a well-defined URI query. In step 803, the further, third, device 116 may retrieve the binding table information for resource R1 via a GET request for resource R1 to the first device 104 containing the URI query. The further device 116 may do so e.g. in order to verify the existence of bindings related to the first REST resource R1 that have been established on the first device 104. In step 804, in response to the REST request from the further device 116, the first device 104 provides a response to the further device 116, containing as a payload only those bindings stored in the binding table of the first device 104 that are associated with the first resource R1. This response is different from that provided in step 704 of FIG. 7 in that it only contains the bindings related to the first REST resource R1.

Figure 9:
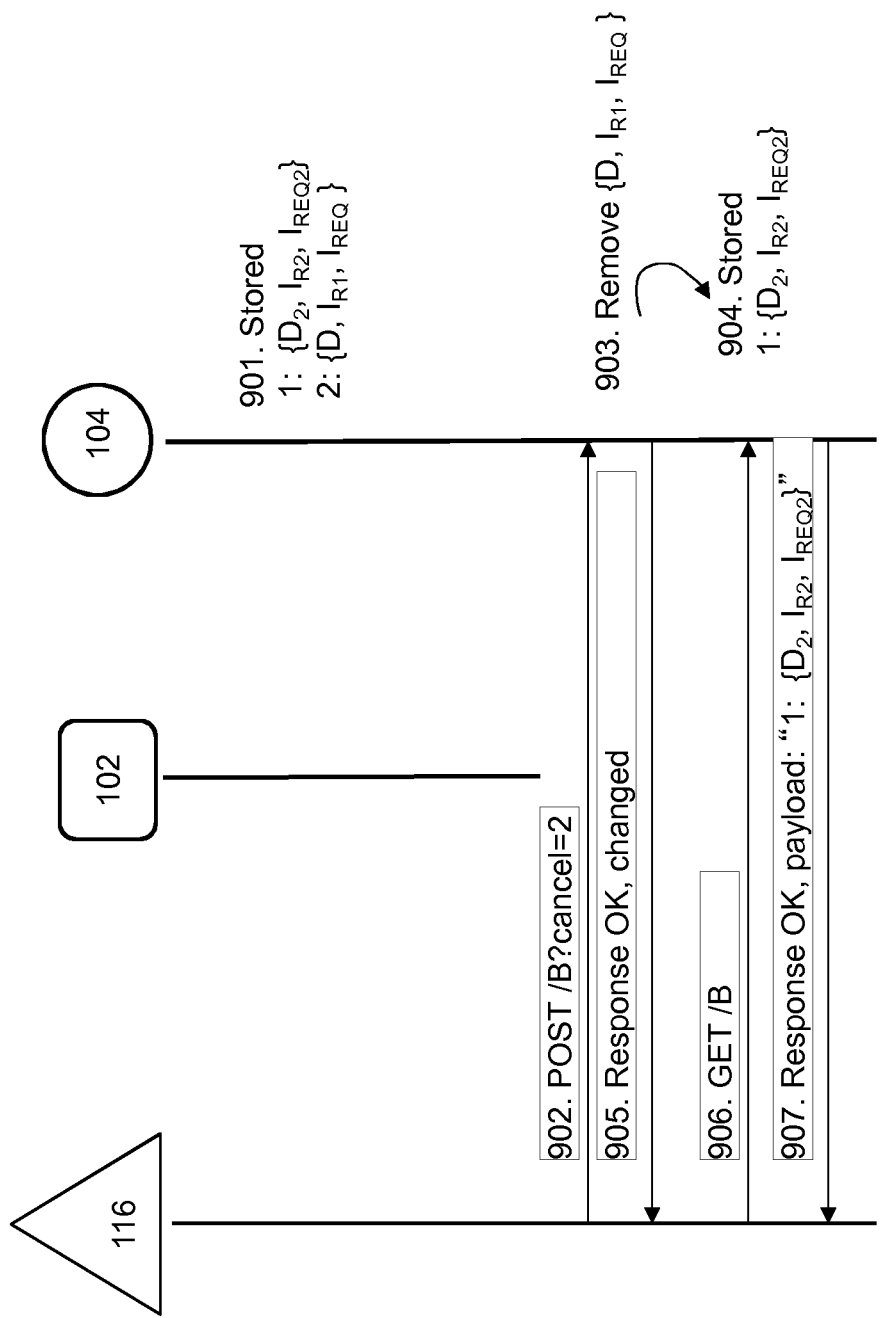
FIG. 9 shows an exemplary messaging diagram illustrating means for cancellation of binding between the first and second devices after the binding information has been exposed via a separate REST resource B, according to one embodiment of the present disclosure.

FIG. 9 shows an exemplary messaging diagram illustrating means for cancellation of binding between the first and second devices after the binding information has been exposed via a separate REST resource B, according to one embodiment of the present disclosure. The implementation shown in FIG. 9 may include the steps described in FIG. 4 and/or FIG. 5, establishing one or more bindings between the first device and one or more second devices. As a result, the binding table on the first device 104 may contain multiple entries, as shown in FIG. 9 with step 901 with binding entries "1" and "2" related, respectively, to REST resources R2 and R1 hosted by the first device 104. In addition, the implementation shown in FIG. 9 may include the steps described in FIG. 7, making all of the binding information stored in the binding table of the first device available via a separate, well-defined REST 'binding' resource B.

As shown in FIG. 9, in step 902 the further device 116 sends a REST request for the REST 'binding' resource B to the first device 104 requesting the removal of information stored in the binding table. The payload of the request identifies that it is the entry "2" that should be removed from the binding table. In step 903, in response to that request, the first device 104 removes the entry "2", which results in the binding table storing information as shown with step 904.

In an optional step 905, the first device may then provide a confirmation to the further device 116, indicating that the entry "2" has been removed. If the further device 116 would then, also optionally, issue a GET request for the REST 'binding' resource B to the first device 104, as shown with step 906, then in response it would obtain from the first device the information from the binding table which now contains only entry "1".

In order for this embodiment to be implemented, the further device 116 should be given access to the REST 'binding' resource B, i.e. the POST method should be allowed, and needs to have sufficient access rights to remove information from the binding table of the first device.

The difference between the cancellation of a particular binding done as illustrated in FIG. 6 and the cancellation of FIG. 9 is that the cancellation of FIG. 6 can only be done by the binding initiator 102 because the third REST request operates on the same resource as the first REST request and must, therefore, come from the same device (i.e., device with the same IP address, same port, etc.), the binding initiator. On the other hand, the cancellation of FIG. 9 may be done by either the binding initiator 102 or any other device that is allowed to manipulate the binding table.

Figure 10:
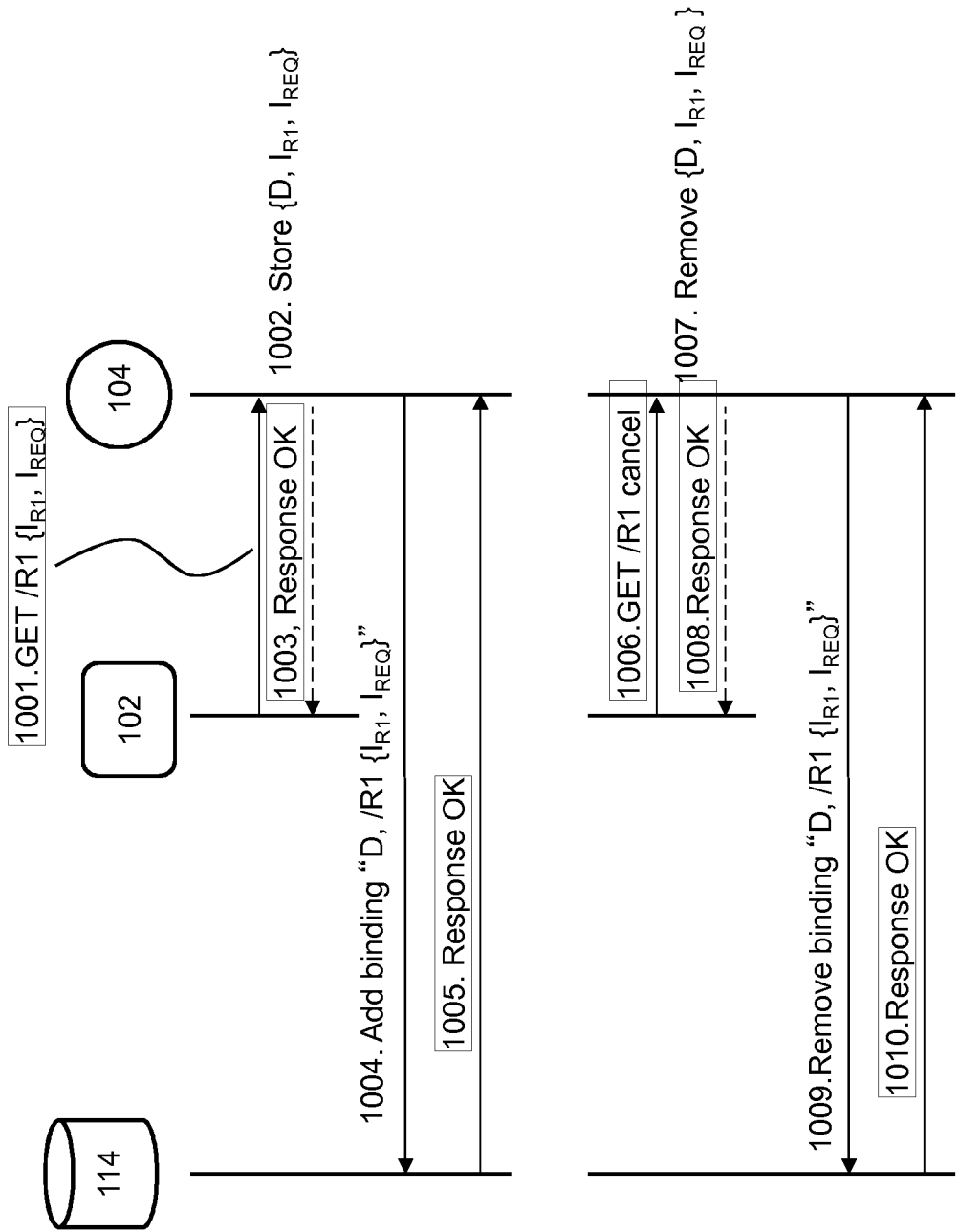
FIG. 10 shows an exemplary messaging diagram illustrating means for storing binding information in and removing binding information from a binding directory, according to one embodiment of the present disclosure.

FIG. 10 shows an exemplary messaging diagram illustrating means for storing binding information in and removing binding information from a binding directory, such as e.g. the binding directory 114 of FIG. 1, according to one embodiment of the present disclosure. The implementation shown in FIG. 10 may include any of the steps described in any of the other messaging diagrams described herein. For example, it may include steps 1001-1003, establishing a binding between the first device and the second device via a REST request for a REST resource R1 on the first device. Steps 1001-1003 are analogous to steps 401-403 of FIG. 4, and, therefore, their description is not repeated here. The method of FIG. 10 further includes step 1004 where the first device 104 is configured to inform the binding directory 114 about the storage of information related to the first REST resource R1 in the binding table. The binding directory 114 may then, optionally, provide a response to the first device 104 indicating that it has received and stored that binding information as well, shown with step 1005. Similarly, if the binding associated with the REST resource R1 is cancelled from the binding table, as shown in FIG. 10 with steps 1006-1008, then in step 1009, the first device 104 may be configured to inform the binding directory 114 about the removal of information related to the first REST resource R1 from the binding table. The binding directory 114 may then, optionally, provide a response to the first device 104 indicating that it has removed that binding information as well, shown with step 1010. Steps 1006-1008 are analogous to steps 602, 603, 605 of FIG. 6, and, therefore, their description is not repeated here. While addition of binding information to the binding table and removal of binding information from the table is shown in FIG. 10 with reference to FIG. 4 and FIG. 6, respectively, in other embodiments addition and removal of the information from the binding table may be done in different manners. In a further embodiment, it may be possible that in steps 1004 and 1009 instead of receiving the information that has been stored or removed in the binding table of the first device 104, the binding directory 114 is only informed about the fact that the binding table of the first device 104 has changed. Upon reception of such information, the binding directory may execute steps analogous to steps 703 and 704 in order to retrieve the actual information. By storing all information in the binding directory 114, it is possible to obtain an up-to-date overview of all available bindings in the (constrained) network(s) the binding directory may be responsible for. The binding information is, preferably, stored in the binding directory 114 in such a manner that it can be easily queried, filtered, verified, etc.

Figure 11:
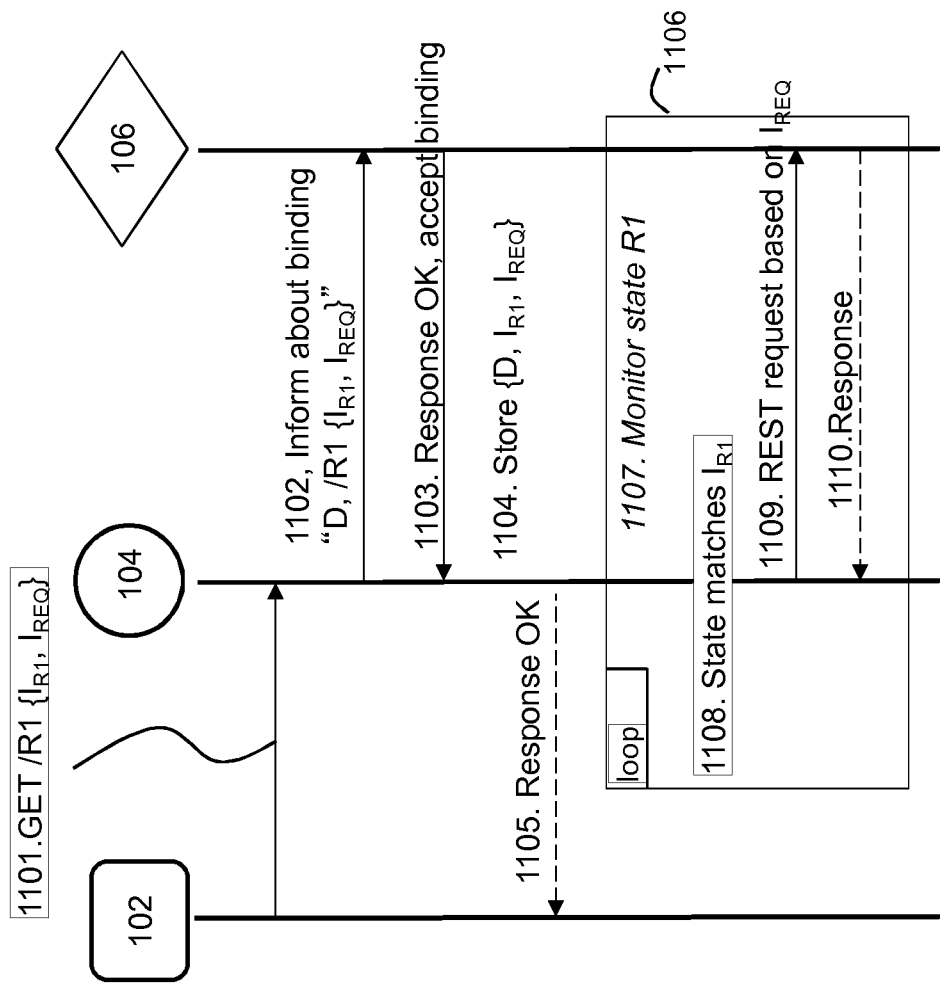
FIG. 11 shows an exemplary messaging diagram illustrating means for informing the second device about the binding with the first device, according to one embodiment of the present disclosure.

FIG. 11 shows an exemplary messaging diagram illustrating means for informing the second device 106 about the binding with the first device 104, according to one embodiment of the present disclosure. The implementation shown in FIG. 11 may include any of the steps described in any of the other messaging diagrams described herein. In particular, it may include step 1101 where the first device 104 receives the first REST request for the REST resource R1 and establishes the binding with the second device 106, as described in greater detail in FIG. 4. The method may further include step 1102, where the first device then provides a message to the second device 106, informing the second device about the creation of the binding. In step 1103, the second device 106 may, optionally, inform the first device that it has received the message of step 1102 and also indicate that the second device has accepted the binding. After that, the first device may store the binding information in step 1104 and, optionally, inform the binding initiator 102 about the creation of the binding, in step 1105. Steps 1101, 1104, and 1105 are analogous to steps 401-403 of FIG. 4, and, therefore, their description is not repeated here. The method of FIG. 11 may then include the loop 1106 with steps 1107-1110, analogous to the loop 404 with steps 405-408 of FIG. 4, respectively, and, therefore, their description is also not repeated here.

In an embodiment, it may be possible that in step 1103 instead of receiving a response from the second device 106 accepting the binding, the first device receives a response indicating that the binding has not been accepted, such a response possibly also containing the reason of the failure (not shown in FIG. 11). In this case, the first device 104 may be configured to send a response to the binding initiator 102 informing the binding initiator about (the reason for) the failure. In this manner, the second device 106 can implement specific policies determining which bindings will be allowed/accepted. This way the second device 106 can determine from whom it will accept REST requests for triggering actions in the real world.

In a further embodiment, since the second device 106 is now informed about the creation of the binding with the first device, it may store this information locally (i.e., on the second device) and, optionally, make it available via a 'binding' resource as well, similar to how the first device may make the binding information available via the 'binding' resource B, as described in FIG. 7.

Figure 12:
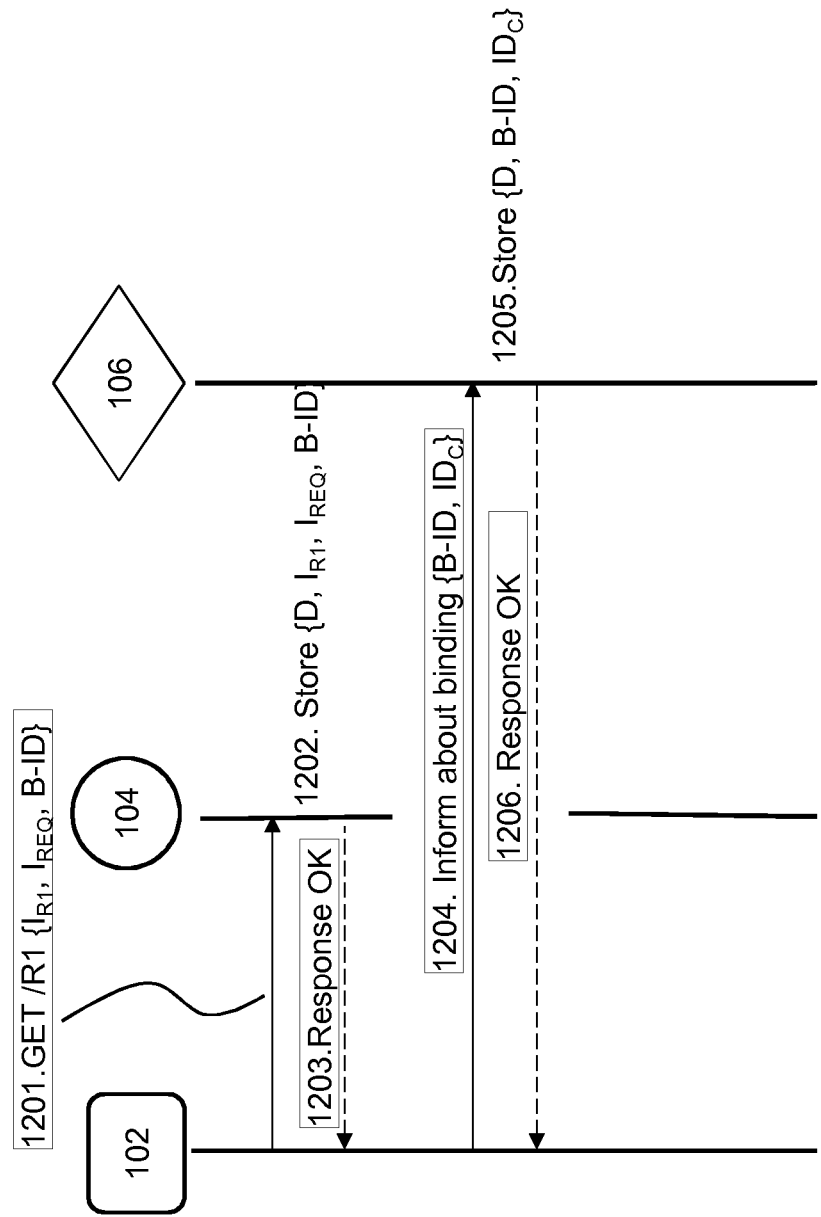
FIG. 12 shows an exemplary messaging diagram illustrating means for establishing a binding identification, according to one embodiment of the present disclosure.

FIG. 12 shows an exemplary messaging diagram illustrating means for establishing a binding identification (ID), according to one embodiment of the present disclosure. The implementation shown in FIG. 12 may include any of the steps described in any of the other messaging diagrams described herein. As shown in FIG. 12, in step 1201, the first REST request for the REST resource R1 on the first device 104 may include a binding ID, B-ID, that has been generated by the binding initiator 102. In step 1202, the first device 104 stores the binding ID in its binding table, along with the other information related to the request. In step 1203, the first device may provide a confirmation to the binding initiator. Besides the use of the binding ID, the steps 1201-1203 are analogous to steps 401-403 of FIG. 4, and, therefore, their description is not repeated here.

In step 1204, the binding initiator 102 may inform the second device 106 about the binding by providing to the second device the binding ID, possibly together with an identifier of the first device 104, ID.sub.C, which could be e.g. the IPv6 address of the first device. The second device 106 may then, in step 1205, store the information received from the binding initiator 102 together with an identifier D of the binding initiator 102 and, optionally, provide a corresponding confirmation to the binding initiator 102 (step 1206).

In one further embodiment of FIG. 12, the binding initiator 102 may be configured to first inform the second device 106 about the binding ID and only after that provide the binding ID to the first device 104.

In another embodiment, not shown in FIG. 12, the binding ID may be generated by the first device 104, communicated by the first device to the binding initiator 102 and further communicated by the binding initiator 102 to the second device 106, the latter being done possibly together with an identifier of the first device.

In yet another embodiment, not shown in FIG. 12, the binding ID may be generated by the second device 106 upon receiving a request from the binding initiator 102 possibly together with an identifier of the first device, and communicated by the second device 106 to the binding initiator 102 and by the binding initiator 102 to the first device 104.

An agreed binding ID, particularly if it is distributed via the trusted binding initiator 102, can be advantageously used as a light-weight means to accept the creation of a binding by second device 106 and/or to allow execution of second REST request.

Figure 13:
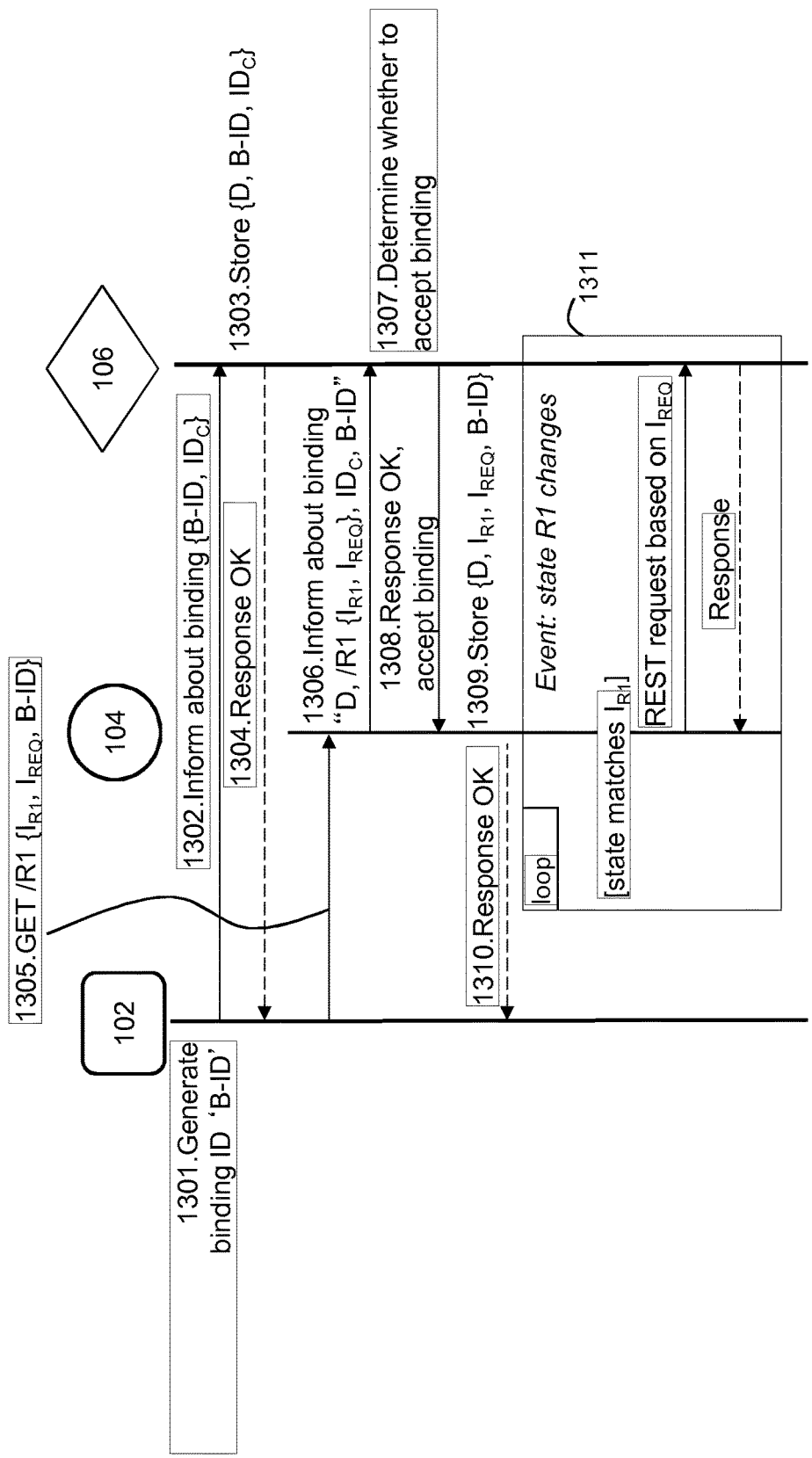
FIG. 13 shows an exemplary messaging diagram illustrating means for using a binding identification to only execute actions associated with accepted bindings, according to one embodiment of the present disclosure.

FIG. 13 shows an exemplary messaging diagram illustrating means for using a binding identification to only execute actions associated with accepted bindings, according to one embodiment of the present disclosure. The implementation shown in FIG. 13 may include any of the steps described in any of the other messaging diagrams described herein. In step 1301, the binding initiator 102 generates the binding ID, B-ID, and, in step 1302, informs the second device 106 about the creation of the binding ID, providing to the second device the binding ID and the identifier of the first device 104 that will use that binding ID. The second device 106 then stores the information received from the binding initiator (step 1303) together with an identifier D of the binding initiator 102 (similar to FIG. 12, e.g. IPv6 derived from message received from binding initiator; does not need to be provided explicitly, i.e. as payload in the message) and returns the response to the binding initiation in step 1304. Steps 1302-1304 may be performed in the same manner as steps 1204-1206, described above.

The binding initiator 102 may then provide the first REST request to the first device 104, illustrated in step 1305, analogous to step 1201, described above. The first device 102 may then inform the second device 106, in step 1306, about creation of the binding, providing to the second device the binding ID that the first device has received from the binding initiator. In step 1307, the second device 106 checks whether the information (i.e., the binding ID, identifier of the first device and identifier of the binding initiator) received by the second device from the first device 104 matches that information as received from the binding initiator 102 and stored in the second device. If this is the case, then the second device 106 accepts the binding and provides a response to the first device 104 indicating that the binding has been accepted (step 1308). The first device 104 may then store, in step 1309, the information associated with this binding in its binding table and provide a confirmation to the binding initiator 102, in step 1310. Steps 1309 and 1310 may be done in the same manner as steps 1202 and 1203, described above.

If, however, in step 1307, the second device 106 determines that the information received from the first device does not match the information received from the binding initiator and stored in the second device, then the second device could provide a response to the first device indicating that the binding has not (yet) been accepted since there was no matching information on the second device (not shown in FIG. 13). The first device 104 may then send a response to the binding initiator 102 informing the binding initiator 102 about the reason of the failure (not shown in FIG. 13).

Once the second device 106 accepted the binding, the method may proceed to the loop 1311 comprising the steps leading to the execution of the second REST request. Since the steps of the loop 1311 are similar to those described for the loop 404, in the interests of brevity their description is not repeated here.

Figure 14:
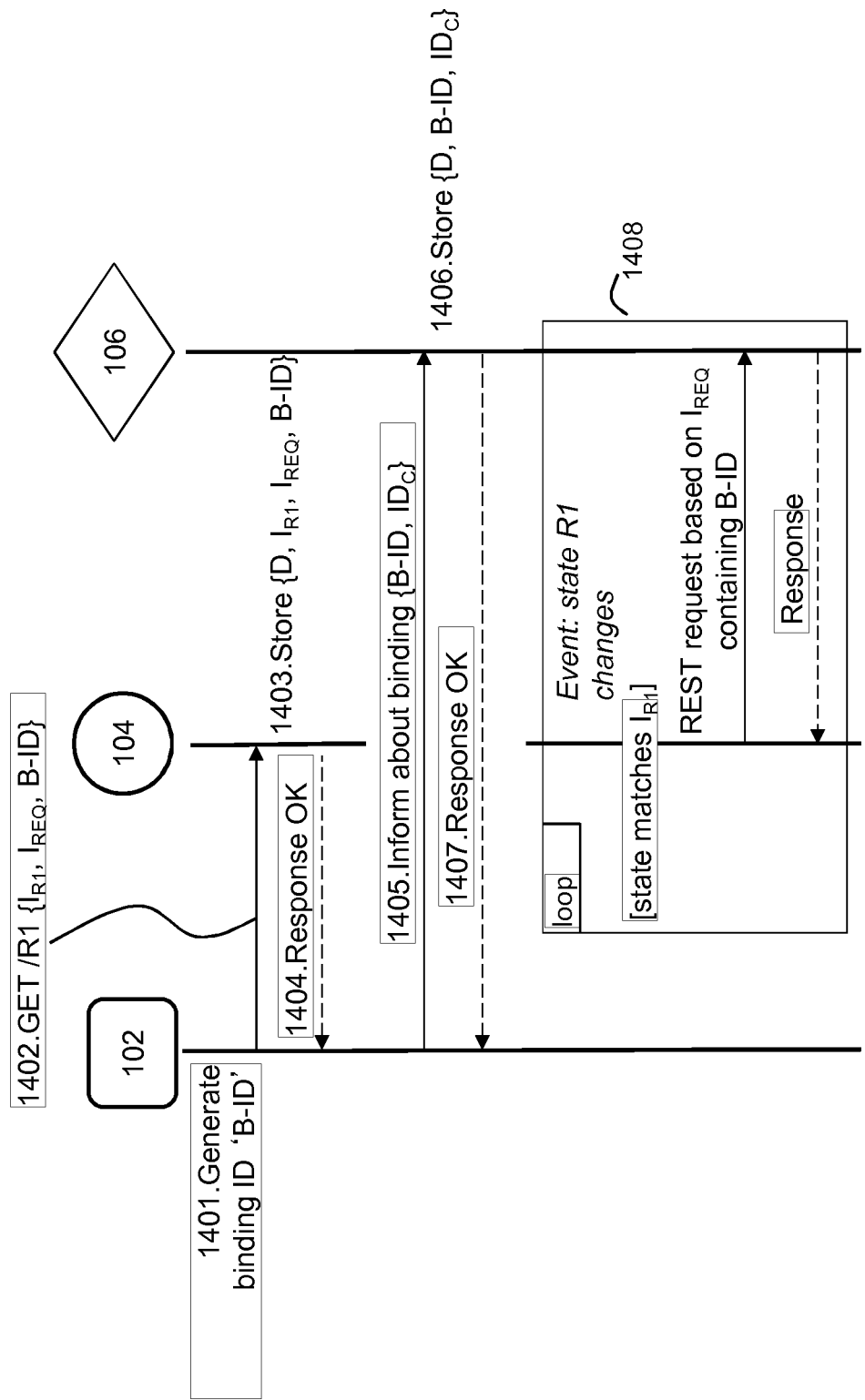
FIG. 14 shows an exemplary messaging diagram illustrating means for using a binding identification in second REST requests, according to one embodiment of the present disclosure.

FIG. 14 shows an exemplary messaging diagram illustrating means for using the binding ID in second REST requests, according to one embodiment of the present disclosure. The implementation shown in FIG. 14 may include any of the steps described in any of the other messaging diagrams described herein where the binding ID was generated.

In particular, the method of FIG. 14 may include steps 1401, 1402, 1403, and 1404, analogous to steps 1301, 1201, 1202, and 1203, respectively, and, therefore, their description is not repeated here.

The method of FIG. 14 may also include steps 1405, 1406, and 1407, analogous to steps 1204, 1205, and 1206, respectively, and, therefore, their description is also not repeated.

The method of FIG. 14 may also include a loop 1408 comprising steps analogous to those of the loop 404, except that when the second REST request is provided from the first device 104 to the second device 106, the second REST request also includes the binding ID. The second device 106 may implement an additional level of checks by only executing the second REST request in the loop 1408 when the second device determines that the information derived from the second REST request, such as the binding ID, but also possibly the identifier of the binding initiator and the identifier of the first device, matches stored information about accepted bindings on the second device.

Figure 15:
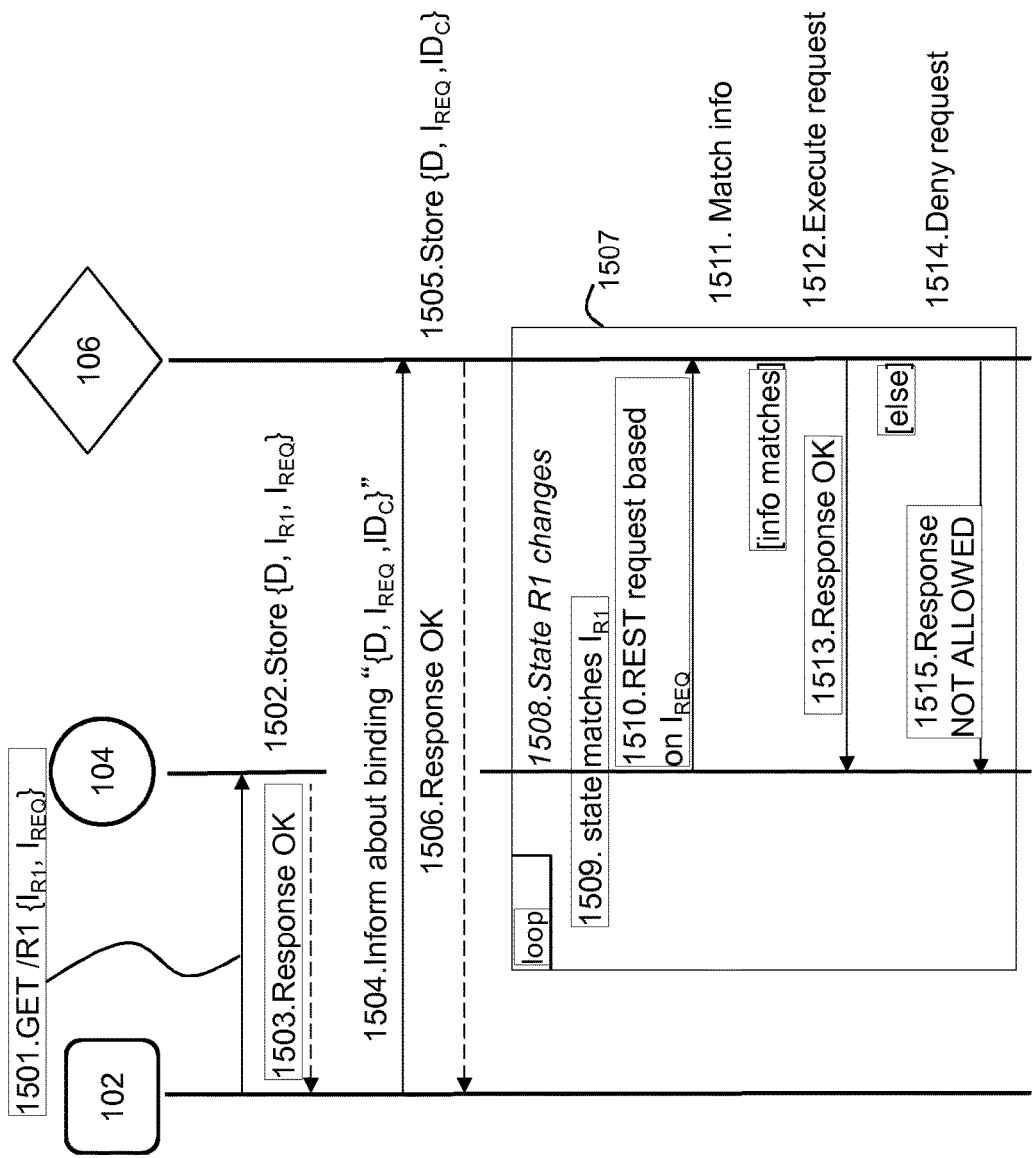
FIG. 15 shows an exemplary messaging diagram illustrating means for split binding creation, according to one embodiment of the present disclosure.

FIG. 15 shows an exemplary messaging diagram illustrating means for split binding creation, according to one embodiment of the present disclosure. The implementation shown in FIG. 15 may include any of the steps described in any of the other messaging diagrams described herein.

The method of FIG. 15 may e.g. start with steps 1501, 1502, and 1503, related to the provisioning of the first REST request from the binding initiator 102 to the first device 104. These steps may be the same as steps 401, 402, and 403, and, therefore, their description is not repeated here.

The method of FIG. 15 may also include step 1504 where the binding initiator 102 informs the second device 106 about the binding by providing D, I.sub.REQ, and ID.sub.C. In step 1505 the second device 106 stores the information received in step 1504. In step 1506, the second device 106 may provide a response to the binding initiator 102 indicating receipt of the information in step 1504.

The method of FIG. 15 may also include a loop 1507 comprising steps 1508, 1509, and 1510 analogous to steps 405, 406, and 407, respectively, of the loop 404, whose description, therefore, is not repeated here.

The loop 1507 may further include step 1511, where the second device 106 derives information from the second request received in step 1510 and matches that information with that stored in step 1505. The second device 106 may then be configured to execute the second REST request only when the information derived from the second REST request matches stored information about accepted bindings on the second device, as shown in FIG. 15 with steps 1512 and 1513. If that is not the case, then the second device is configured to deny the second REST request (step 1514) and provide a response indicative of this to the first device 104 in step 1515. In this manner, the second device (e.g. an actuator) can be configured to only allow requests about which it has been informed by a trusted party (i.e. the binding initiator). If another device tries to make the same request as the first device, this request will be denied, since no information about this other device is present in the second device. Thus, greater control over binding establishment and execution can be achieved.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving, at a sensor device, from a binding initiator, a first REST(Representational State Transfer) request for a first REST resource hosted by the sensor device, the first REST request comprising at least an identification of an action to be executed on an actuator device and an identification of a condition of a state of the first REST resource for executing the action on the actuator device;
storing, in a binding table of the sensor device, the identification of the action to be executed on the actuator device and the identification of the condition for executing the action on the actuator device as information related to the first REST resource; monitoring, by the sensor device, the state of the first REST resource to determine whether the state satisfies the condition identified in the first REST request; after determining that the state of the first REST resource satisfies the condition,
providing, from the sensor device directly to the actuator device, a trigger for the actuator device to execute the action identified in the first REST request, wherein the trigger is provided in a form of a second REST request.

2. The method according to claim 1, further comprising providing a response to the binding initiator indicating receipt of the first REST request.

3. The method according to claim 1, further comprising providing, from the sensor device to the binding initiator, information indicative of the state of the first REST resource when the state changes and satisfies the condition identified in the first REST request.

4. The method according to claim 1, further comprising the sensor device making at least part of information stored in the binding table available via a second REST resource, the second REST resource being different from the first REST resource.

5. The method according to claim 1, further comprising the sensor device making at least part of information stored in the binding table available through a GET request for the first REST resource with a URI query.

6. The method according to claim 1, further comprising:
receiving, at the sensor device, from either the binding initiator or a further device, a third REST request comprising an indication that the sensor device should no longer provide the trigger to the actuator device to execute the action identified in the first REST request; and
removing the identification of the action to be executed on the actuator device and the identification of the condition for executing the action on the actuator device from the binding table.

7. The method according to claim 1, further comprising the sensor device providing to a binding directory external to the sensor device at least part of the information related to the first REST resource as stored in the binding table.

8. The method according to claim 1, further comprising: providing, from the sensor device to the actuator device, at least a part of the first REST request as an indication of a creation of binding between the sensor device and the actuator device; and receiving, at the sensor device, from the actuator device, an indication that the creation of binding has been accepted by the actuator device.

9. The method according to claim 1, further comprising: the sensor device obtaining a binding identification (B-ID) identifying binding between the sensor device and the actuator device; and
the sensor device including the binding identification within the second REST request provided to the actuator device.

10. A computer program product, preferably implemented on computer-readable non-transitory storage medium, comprising software code portions configured, when executed by a processor of a sensor device, for enabling the sensor device to perform the steps of claim 1.

11. A sensor device comprising:
a receiver for receiving, from a binding initiator, a first REST(Representational State Transfer) request for a first REST resource hosted by the sensor device, the first REST request comprising at least an identification of an action to he executed on an actuator device and an identification of a condition for executing the action on the actuator device;

and a processor for:
storing, in a binding table of the sensor device, the identification of the action to he executed on the actuator device and the identification of the condition liar executing the action on the actuator device as information related to the first REST resource,
monitoring a state of the first REST resource to determine whether the state satisfies the condition identified in the first REST request, and after determining that the state of the first REST resource satisfies the condition,
providing to the actuator device directly a trigger for the actuator device to execute the action identified in the first REST request, wherein the trigger is provided in a form of a second REST request.

12. A binding initiator configured for use with the sensor device according to claim 11, the binding initiator configured at least for providing to the sensor device the first REST request for the first REST resource hosted by the sensor device, the first REST request comprising at least the identification of the action to be executed on the actuator device and the identification of the condition for executing the action on the actuator device.

13. An actuator device configured for use with the sensor device according to claim 11, the actuator device configured at least for:
receiving the second REST request comprising the trigger to execute the action identified in the first REST request; and
executing the action.

* * * * *

UNITED STATES PATENT AND TRADEMARK OFFICE
CERTIFICATE OF CORRECTION

PATENT NO. : 10,338,980 B2
APPLICATION NO. : 15/706639
DATED : July 2, 2019
INVENTOR(S) : Jeroen Hoebeke, Girum Teklemariam and Floris Van Den Abeele Page 1 of 1

It is certified that error appears in the above-identified patent and that said Letters Patent is hereby corrected as shown below:

In the Claims

In Column 22, Line 65, Claim 11, delete "he" and insert -- be --

In Column 23, Line 3, Claim 11, delete "he" and insert -- be --

In Column 23, Line 5, Claim 11, delete "liar" and insert -- for --

Signed and Sealed this
Third Day of September, 2019

Andrei Iancu
*Director of the United States Patent and Trademark Office*